(12) United States Patent
Van De Witte et al.

(10) Patent No.: US 7,009,668 B2
(45) Date of Patent: Mar. 7, 2006

(54) LIQUID CRYSTAL DISPLAY DEVICE WITH REFLECTIVE MATERIAL THAT HIDES SWITCHING MATERIAL

(75) Inventors: Peter Van De Witte, Heerlen (NL); Michael Geoffrey Pitt, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 167 days.

(21) Appl. No.: 10/695,144

(22) Filed: Oct. 28, 2003

(65) Prior Publication Data
US 2004/0092196 A1 May 13, 2004

Related U.S. Application Data

(62) Division of application No. 09/860,356, filed on May 18, 2001, now Pat. No. 6,636,291.

(30) Foreign Application Priority Data
Jun. 6, 2000 (EP) .................................. 00201987

(51) Int. Cl.
G02F 1/1335 (2006.01)
(52) U.S. Cl. .................... 349/113; 349/97; 349/115
(58) Field of Classification Search .................. 349/96, 349/97, 106, 113, 115
See application file for complete search history.

(56) References Cited

U.S. PATENT DOCUMENTS

| | | | |
|---|---|---|---|
| 5,188,760 A | 2/1993 | Hikmet et al. | ......... 252/299.01 |
| 5,555,114 A | 9/1996 | Narita et al. | ................. 359/65 |
| 5,668,614 A | 9/1997 | Chien et al. | ................ 349/115 |
| 5,793,456 A | 8/1998 | Broer et al. | .................. 349/98 |
| 5,818,550 A * | 10/1998 | Kadota et al. | ................ 349/43 |
| 6,016,178 A * | 1/2000 | Kataoka et al. | ............. 349/117 |
| 6,031,512 A * | 2/2000 | Kadota et al. | ................ 345/88 |
| 6,365,916 B1 * | 4/2002 | Zhong et al. | ................. 257/59 |
| 6,459,847 B1 * | 10/2002 | Van De Witte et al. | ..... 385/147 |
| 6,466,281 B1 * | 10/2002 | Huang et al. | ................. 349/44 |
| 6,671,016 B1 * | 12/2003 | Kim | ........................... 349/115 |
| 6,717,639 B1 * | 4/2004 | Jung | ........................ 349/106 |
| 2001/0030720 A1 * | 10/2001 | Ichihashi | .................... 349/106 |
| 2002/0045676 A1 * | 4/2002 | Coates et al. | ............... 522/170 |
| 2002/0130993 A1 * | 9/2002 | Ichihashi et al. | ........... 349/106 |

FOREIGN PATENT DOCUMENTS

| | | |
|---|---|---|
| EP | GB 2314167 | 12/1997 |
| JP | 06-186544 | * 7/1994 |
| JP | 2001-305329 | * 10/2001 |
| WO | WO 0034808 | 12/1999 |

OTHER PUBLICATIONS

S. H. Chen et al, "Communications", Advanced Materials, VCH Verlagsgesellschapt, Weinheim, DE, vol. 11, N. 14, Oct. 1, 1999, pp. 1183-1186, XP000864822.

* cited by examiner

Primary Examiner—Tarifur R. Chowdhury (57) ABSTRACT

In a method of manufacturing a liquid crystal device including a layer having a fixed cholesteric order, the patterned layer is manufactured by providing a layer comprising polymerizable cholesterically ordered material and a compound convertible by means of radiation from a non-converted to converted state. The pitch of the cholesterically ordered material is influenced by the compound in its converted state to a different extent than in its converted state. The polymerizable layer is then irradiated pattern-wise thus creating regions of different pitch. The irradiated layer is then polymerized and/or cross-linked to fix the cholesteric order thus obtained.

7 Claims, 7 Drawing Sheets

FIG. 11

LIQUID CRYSTAL DISPLAY DEVICE WITH REFLECTIVE MATERIAL THAT HIDES SWITCHING MATERIAL

This application is a divisional application of U.S. patent application Ser. No. 09/860,356, filed 18 May 2001, now U.S. Pat. No. 6,636,291, issued 21 Oct. 2003, which claims priority benefit under 35 U.S.C. 119 from European Patent Application 00201987.5, filed 6 Jun. 2000.

The invention relates to a method of manufacturing a liquid crystal display device comprising liquid crystalline material dispersed between a first and a second substrate, the first substrate comprising a patterned layer of a polymerized material having a cholesteric order wherein the axis of the molecular helix extends transversely to the layer.

The invention further relates to a method of manufacturing a liquid crystal display device comprising a layer of a polymerized material having a cholesteric order wherein the axis of the molecular helix extends transversely to the layer and wherein the pitch of the helix shows exhibits a gradient in the direction along the axis.

The invention also relates to a liquid crystal display device, such as one obtainable by one of the methods above.

A method as mentioned in the opening paragraph is known per se. For example, United Kingdom patent specification GB 2,314,167 describes a liquid crystal (LC) display for stereoscopic vision comprising a patterned layer of a cholesterically ordered material. In accordance with this patent specification, such a layer may be manufactured by first providing a uniform layer of a cholesteric material on a substrate. By polymerizing areas of this layer at different temperatures, a patterned cholesteric layer is obtained. Use is made of the fact that the pitch of the molecular helix of the cholesterically ordered material is temperature-dependent. By polymerizing areas of the layer at a given temperature, the pitch associated with this temperature is, as it were, frozen in these areas.

The known method has drawbacks. For example, in practice it has been found that the known method is difficult to implement. This notably applies to the case where more than two areas having mutually different pitches must be provided in the layer. In that case, the method of manufacture is elaborate in that a relatively large number of masking steps is necessary and the precision with which the masks are adjusted is very critical. Moreover, the maximum difference in pitch which can be realized between the different areas by means of the known method appears to be relatively small. Patterning at different temperatures also appears to be difficult in practice.

It is an object of the invention to obviate these drawbacks. More particularly, it is an object of the invention to provide a method of manufacturing a liquid crystal display comprising a patterned layer of a polymerized material having a fixed cholesteric order wherein the patterned layer is manufactured using a simple and cost-effective method. The patterning step(s) of said the method should not necessarily involve the use of different temperatures and allow relatively large pitch differences between the different regions of the patterned layer to be obtained.

These and other objects achieved by a method of manufacturing a liquid crystal display device comprising a liquid crystal layer dispersed between a first and a second substrate, the first substrate comprising a patterned layer of a polymerized material having a fixed cholesteric order wherein the axis of the molecular helix extends transversely to the patterned layer and the patterned layer has at least a first and a second region in which the pitch of the molecular helix is mutually different, in which method the patterned layer of a polymerized material having a fixed cholesteric order is manufactured in accordance with a method comprising the steps of:

a. providing a layer of a polymerizable and/or crosslinkable cholesterically ordered material comprising a quantity of a convertible compound which in its non-converted and in its converted state determines the pitch of the cholesterically ordered material to a different extent, the conversion of said compound being inducable by radiation, b. irradiating the layer in accordance with a desired pattern so that at least in a first region the convertible compound is converted to a different extent than in a second region, c. polymerizing and/or crosslinking the irradiated polymerizable and/or crosslinkable cholesterically ordered material to form a three-dimensional polymerized cholesterically ordered material in which the cholesteric order is fixed.

It has been found that, using the method according to the invention, the patterned layer of cholesterically ordered material can be manufactured in a simple and cost-effective manner. The method is performed at the same temperature throughout, with the maximum pitch difference between the areas being relatively large. In any case, the pitch difference is sufficient to provide the patterned layer with colored regions spanning the entire visible range thus allowing full-color LC displays to be manufactured in a simple manner.

Due to the presence of the molecular helix, the patterned layer of cholesterically ordered material has regions which each selectively reflect circularly polarized electromagnetic radiation of a band of wavelengths. The central wavelength $\lambda$ of the band of reflected wavelenghts is determined by the pitch p of the molecular helix, according to $\lambda = p.n$, where n is the average refractive index of the cholesterically ordered material. The bandwidth $\Delta\lambda$ is given by $\Delta\lambda = p.\Delta n$, where $\Delta n$ is the birefringence of the uniaxially oriented phase corresponding to the cholesterically ordered phase. In the visible range, the regions selective reflect circularly polarized light of a particular color. Typically, with $\Delta n$ being less than about 0.15 and n of the order 1, the bandwidth in the visible range of the spectrum is 60 to 90 nm.

Because the patterned layer does not absorb any radiation incident upon it, it is not only a color and circular light selective reflector, but also a filter which selectively transmits light of the opposite handedness within the reflection band. Outside its reflection band, the cholesterically ordered material is transparent and transmits both polarization components.

By (partially) converting the convertible compound in the irradiated regions of the layer, the pitch of the molecular helix in the layer, and thus the color, is altered in these regions. The difference in pitch between the first and the second region is proportional to the difference in the amount of convertible compound in the converted state and/or the non-converted state between the first and the second region.

The conversion of the convertible compound is effected by irradiation with energy in the form of, for example, electromagnetic radiation, nuclear radiation or an electron beam. Preferably said conversion is effected by means of UV radiation. Being polymerized and/or crosslinked, the cholesteric order of the pattern-wise irradiated layer of polymerizable cholesterically ordered material is fixed. Being fixed, the cholesterically ordered material has lost its liquid crystalline character and is not capable any more to respond to an electric field in a manner typical of liquid crystalline materials.

Having a fixed cholesteric order, the patterned layer is capable of withstanding high temperatures in particular those temperatures which are used during the manufacture of (other parts of) the liquid crystal display device and those temperatures typically experienced during its service life. Also, the patterned layer is resistant to prolonged UV exposure. Resistance to UV exposure is improved if the patterned cholesteric layer is cross-linked.

In U.S. Pat. No. 5,555,114 a method of manufacturing a passive matrix LC display comprising a layer of cholesterically ordered material is disclosed. The known method does not involve the use of convertible compounds to control the pitch. Also, it does not even disclose how a patterned multi-color cholesteric layer is to be manufactured.

It is to be noted that, preferably, the cholesteric layer has a low absorbance for the radiation used in step b, and the radiation intensity along the axis of the helix (i.e. transverse to the layer) is relatively constant within each region. Consequently, the irradiation dose transverse to the layer is relatively constant, and therefore the value of the pitch, viewed along the axis of the helix, is relatively constant within each of the first and second regions of the patterned layer. However, as stated above between the first and second regions the pitch may differ. Viewed in the plane of the layer, the different regions are adjacent to each other, not subjacent.

When the polymerizable cholesteric layer has a high absorbance for the radiation used in step b, the radiation intensity will show a gradient transverse to the layer according to Beer-Lambert's law. Consequently, the top of the layer will receive more radiation than the bottom of the layer. This will lead to the formation of a gradient in the pitch, viewed along the axis of the helix (i.e. transverse to the layer). Adding an light-absorbing material in a non-absorbing cholesteric layer also yields or increases a gradient in the pitch. The gradient in the pitch gives a broadening of the reflection band according to $\Delta\lambda=\Delta p.n$ wherein $\Delta p$ is the difference in maximum and minimum pitch of the gradient. Using pitch gradients broad-band cholesterically ordered layers can be obtained. Typically, the band may span the entire visible range. Such pitch-gradient layers may be used as broad-band circularly polarized light reflectors and/ or, as no absorption of light occurs, broad-band circularly polarized light filters. Such broad-band filters and reflectors can be advantageously used in the manufacture of an LC display. Thus, in another aspect, the invention relates to a method of manufacturing a liquid crystal display device comprising a layer of a polymerized material having a fixed cholesteric order wherein the axis of the molecular helix extends transversely to the layer and the pitch of the helix has a gradient in the direction of said axis, in which method the layer of polymerized cholesterically ordered material is manufactured in accordance with a method comprising the steps of:

a. providing a layer of a polymerizable and/or crosslinkable cholesterically ordered material comprising a quantity of a convertible compound which in its non-converted and in its converted state determines the pitch of the cholesterically ordered material to a different extent, the conversion of said compound being inducable by radiation, b. irradiating the layer thus converting, at least partially, the convertible compound to its converted state, c. polymerizing and/or crosslinking the irradiated polymerizable and/or crosslinkable cholesterically ordered material to form a three-dimensional polymerized cholesterically ordered material in which the cholesteric order is fixed, wherein the absorption of the polymerizable and/or crosslinkable layer and the intensity of the radiation used in step b are selected such that the radiation is substantially absorbed by the polymerizable and/or cross-linkable layer, creating, transversely to the layer, a gradient in the pitch of the molecular helix.

The method of obtaining the layer of cholesterically ordered material is a rapid method, in particular compared to the methods disclosed in U.S. Pat. No. 5,793,456. An additional advantage of the method according to the invention is that the pitch of the cholesterically ordered material is determined by the irradiation dose instead of the irradiation intensity as in U.S. Pat. No. 5,793,456. A certain irradiation dose can be administered in a short period of time using a high irradiation intensity thus reducing the time to manufacture the layer.

By polymerized and/or crosslinked, the cholesteric order of the pattern-wise irradiated layer of polymerizable cholesterically ordered material is fixed. Being fixed, the cholesterically ordered material has lost its liquid crystalline character and is as not capable any more to respond to an electric field in a manner typical of liquid crystalline materials.

Comprising a layer having a fixed cholesteric order, the gradient-pitch cholesteric layer is capable of withstanding high temperatures in particular those temperatures which are used during the manufacture of (other parts of) the liquid crystal display device and those temperatures typically experienced during its service life. Also, it is resistant to prolonged UV exposure. Resistance to UV exposure is improved if the pitch-gradient cholesteric layer is cross-linked.

Alternatively, the method of manufacturing the cholesterically ordered layer having a pitch gradient used in the present invention may be combined with the methods described in U.S. Pat. No. 5,793,456. In said combination the effects of photo-isomerisation and diffusion are combined in order to obtain an even larger gradient in the pitch of the molecular helix.

An embodiment of the method according to claim 3 wherein the irradiation dose in accordance with step b decreases from the top to the bottom of the cholesteric layer, is characterized in that, at the bottom of the cholesteric layer, said irradiation dose is less than 0.9 times the irradiation dose at the top of said layer.

When the cholesteric layer is made to absorb the radiation used in accordance with step b, the radiation intensity will show a gradient transverse to the layer according to Beer-Lambert's law. Consequently, the top of the layer will receive more radiation than the bottom of the layer. Said variance in the irradiation dose over the cross-section of the layer will lead to the formation of a gradient in the pitch of the molecular helix, viewed along the axis of the helix (i.e. transverse to the layer). This gradient in the pitch provides the optically active layer with a larger bandwidth, the value of which is proportional to the value of the variation in the pitch. When the cholesteric material's absorbance of the radiation used in method step b is to small to produce the desired gradient in the pitch of the molecular helix in a certain amount of time, an absorbing material may be added to the cholesteric layer to obtain the required absorbance.

A preferred embodiment of the method according to claim 3 is characterized in that, at the bottom of the cholestric layer, the irradiation dose in accordance with step b is less than 0.75 times the irradiation dose at the top of said layer. Said preferred variation of the irradiation dose across the thickness of the cholesteric layer yields a reflection band, which may span a substantial part of the visible spectrum.

An interesting embodiment of the method according to the invention is characterized in that irradiation in accordance with step b is performed such that the irradiation dose is different for at least a first and a second region of the layer thus obtaining a patterned cholesterically ordered layers which regions are juxtaposed, as viewed in the plane of the layer, and have a different value of the pitch of the molecular helix. The different irradiation doses may be realized using different irradiation periods at a substantially constant intensity. Alternatively, the different irradiation doses may be realized by using a higher irradiation intensity at a substantially constant irradiation period.

Pattern-wise irradiation can be performed sequentially by means of, for example, a laser or by means of a mask. Preferably, however, if more than two regions having mutually different pitch are to be made, masks are used having a number of apertures which have a different transmissivity to the radiation used. Such a mask is also referred to as a grey-scale mask. It has three or more areas in which the pitch of the molecular helix is different can be obtained in one irradiation step, using one mask.

In particular a patterned layer comprising red green and blue colored regions can be manufactured using a single mask exposure instead of three masks as is done conventionally. Moreover, the multi-color patterned layer can be obtained without using any lithographic patterning step.

The use of a grey-scale mask is an invention independent of the methods of manufacturing of the present invention. In particular it can be used for any method of providing a patterned layer of cholesterically ordered layer which involves the steps a and b and not necessarily c or, if a polymerization step and/or cross-linking step is performed, the polymerization and/or cross-linking need not be such that the cholesteric order is fixed. For example, the grey-scale mask can be used to obtain a patterned anisotropic cholesterically ordered gel analogous to gels disclosed in U.S. Pat. No. 5,188,760. Also, the grey-scale mask may be used to manufacture the active color filters disclosed in U.S. Pat. No. 5,668,614.

In principle, a large number of types of convertible compounds influencing the pitch of the molecular helix of cholesterically ordered material may be used within the scope of the invention. In the first place, convertible chiral compounds are feasible, which, due to irradiation, fall apart into non-chiral compounds. The presence of chiral compounds promotes the formation of a cholesteric order in a liquid crystalline solution. Irradiation of selected areas of a cholesterically ordered layer with decomposable chiral compounds leads to an increase of the pitch of the molecular helix in these areas.

Another advantageous embodiment of the method according to the invention is characterized in that the convertible compound comprises an isomerizable, chiral compound. The different isomeric forms of such an isomerizable chiral compound usually have a different influence on the pitch of the molecular helix of the cholesterically ordered material. By locally changing the ratio of these isomeric forms by way of irradiation, the pitch is changed. This provides an elegant possibility of manufacturing patterned layers of a polymer material with a cholesteric ordering and a different pitch. To prevent diffusion of the isomerizable, chiral compound in the patterned layer, this compound is preferably bound via a chemical bond to the liquid crystalline polymer material having the cholesteric order. In the latter case, the UV stability of the patterned layer also appears to have been improved.

Further examples of suitable convertible compounds are the tunable chiral compounds disclosed in U.S. Pat. No. 5,668,614.

The polymerizable and/or cross-linkable cholesterically ordered material used in the method according to the invention comprises liquid crystalline monomers, liquid crystalline oligomers and/or liquid crystalline linear polymers with reactive groups. Due to the presence of these reactive groups, this material can be converted into a polymer material by polymerization and/or into a three-dimensional molecular network by crosslinking. For the reactive groups, notably epoxy groups, vinyl ether groups and/or thiolene groups are suitable. Particularly suitable reactive groups are those of the (meth)acrylate type. It has been found that cholesterically ordered polymer layers having a high optical quality can be obtained with these types of reactive groups. It is to be noted that, when using linear polymers, only crosslinking is necessary for obtaining a three-dimensional network. However, when monomers and/or oligomers are used, polymerization and crosslinking should take place for obtaining the envisaged three-dimensional molecular network.

In particular a suitable polymerizable cholesterically ordered material comprises nematogenic monomers and a chiral compound which renders the nematogenic monomer capable of forming a cholesteric phase. The chiral compound by itself need not be capable of forming a liquid crystalline phase.

The chiral compound may be a convertible chiral compound in the sense defined above or may be a chiral compound additional to the convertible compound.

The chiral compound may be provided with one or more reactive groups in which case it is built into the (cross-linked) polymer. In particular, the chiral compound may be and preferably is a chiral nematogenic monomer. If the nematogenic monomer and/or chiral (nematogenic) monomer comprises at least two reactive groups of the above-mentioned type the cholesterically ordered material is cross-linkable.

A preferred cholesterically ordered material comprises chiral nematogenic monomers and a chiral convertible compound. Another preferred material comprises nematogenic monomers, a (non-convertible) chiral compound and a chiral convertible compound. Yet another comprises nematogenic monomers, chiral monomers and convertible chiral monomers.

A particularly preferred cross-linkable cholesterically ordered material comprises (chiral) nematogenic monomers having two reactive groups.

The stabilization of the cholesteric layer in process step c after selective adjustment of the pitch of the cholesterically ordered layer in process step b, is an important step in the method according to the invention.

An embodiment of the method according to the invention is therefore characterized in that the polymerization and/or crosslinking is initialized and/or catalyzed by the addition of an initiator or catalyst from the fluid or gaseous phase. Said addition is preferably performed after steps a en b in accordance with the invention in order to prevent a polymerization and/or crosslinking reaction during steps a and b.

Various initiators and catalysts are suitable and are well known to those skilled in the art.

A further embodiment of the method according to the invention is therefore characterized in that polymerization and/or crosslinking is induced by a thermally decomposable initiator. In that case, the layer of cholesterically ordered material preferably comprises a small quantity of a thermally decomposable polymerization initiator. Said initiator is inactive during process step b according to the invention. Subsequently, the polymerization and/or crosslinking of process step c, may be effected by activating the initiator at an elevated temperature.

An embodiment of the method according to the invention is characterized in that polymerization and/or crosslinking is effected by means of electron-beam irradiation. Very hard layers can be manufactured by means of this method. In this variant of the method according to the invention, it is not necessary to use a polymerization initiator.

An embodiment of the method according to the invention is characterized in that polymerization and/or crosslinking is effected by exposure to actinic radiation. The polymerization and/or crosslinking of a layer of the cholesterically ordered material (step c) can take place in the presence of a photo-initiator by using actinic radiation such as UV radiation. An advantage of using photo-polymerization is that this method permits local polymerization and/or crosslinking in very small areas.

Since the conversion of the convertible compound (step b) is also preferably effected by means of UV radiation, step b and step c of the method claimed may interfere with one another. To eliminate or at least substantially reduce the interference among these method steps, the next three preferred embodiments of the method, as described below, may be used:

A first preferred embodiment of the method according to the invention is characterized in that the irradiation in accordance with step b is performed at a temperature, at which the polymerization and/or crosslinking reaction is substantially hampered. The polymerization and/or crosslinking reaction rate is temperature-dependent. At a low temperature (at a high viscosity), the polymerization and/or crosslinking reaction is slower than the reorientation of the molecular helix, thus allowing the pitch of the cholesterically ordered material to be adjusted with limited or substantially no polymerization and/or crosslinking taking place. At a high temperature (at a low viscosity), the polymerization and/or crosslinking reaction is faster than the reorientation of the molecular helix, thus allowing a polymerization and/or crosslinking with a limited or substantially no change in the pitch of the cholesterically ordered material. In conclusion, applying two irradiation steps, each at a different temperature, method steps b and c do not interfere with each other.

A second preferred embodiment of the method according to the invention is characterized in that the irradiation in accordance with step b is performed by means of radiation which is substantially inert with respect to the initiation of the polymerization and/or crosslinking reaction. This method uses two irradiation steps, each step using radiation with a different wavelength. According to this embodiment of the method according to the invention, the layer is irradiated in step b with a desired pattern using radiation which is substantially inert with respect to the initiation of the polymerization and/or crosslinking reaction, thus allowing the pitch of the cholesterically ordered material to be adjusted with limited or substantially no polymerization and/or crosslinking. Subsequently, the polymerization and/ or crosslinking is effected by means of actinic radiation having a suitable wavelength to initiate polymerization and/or crosslinking. Preferably, but not necessarily, said actinic radiation has a wavelength with a limited or substantially no influence on the pitch of the cholesterically ordered material. If said actinic radiation induces an additional change in the pitch of the cholesterically ordered material, then this must be taken into account when setting the pitch of the cholesterically ordered material in process step b.

A third preferred embodiment of the method according to the invention is characterized in that the irradiation in accordance with step b is performed in an atmosphere which substantially hampers the polymerization and/or crosslinking reaction. This method uses two irradiation steps, each step being performed in a different atmosphere. According to this embodiment of the method according to the invention, the layer is irradiated in step b with a desired pattern in an atmosphere comprising molecules, e.g. oxygen or nitrogen-monoxide, that quench the activated photo-initiators. Said quenching essentially deactivates the activated photo-initiators and thereby hampers the polymerization and/or crosslinking reaction. Consequently, the pitch of the cholesterically ordered material can be adjusted with limited or substantially no polymerization and/or crosslinking. Subsequently, the polymerization and/or crosslinking in accordance with step c is initiated by irradiation in a non-quenching atmosphere, e.g. nitrogen. Preferably, but not necessarily, the second wavelength used for the irradiation in accordance with step c, has a limited or substantially no influence on the pitch of the cholesterically ordered material. If said actinic radiation induces an additional change in the pitch of the cholesterically ordered material, then this must be taken into account when setting the pitch of the cholesterically ordered material in process step b.

The invention also relates to a liquid crystal device obtainable by a method in accordance with the invention.

The invention further relates to a liquid crystal display device. In accordance with the invention it is a liquid crystal display device comprising a liquid crystal layer dispersed between a first and a second substrate, the first substrate comprising a patterned layer of a polymerized and/or cross-linked material having a fixed cholesteric order wherein the axis of the molecular helix extends transversely to the patterned layer, wherein the patterned layer comprises a quantity of a convertible compound which in its non-converted and in its converted state determines the pitch of the cholesterically ordered material to a different extent, the conversion being inducable by radiation and wherein the patterned layer has at least a first and a second region in which the pitch of the molecular helix is mutually different.

The liquid crystal device comprising the layer of polymerized material of fixed cholesteric order in accordance with the invention or obtainable by the method in accordance with the invention, can be manufactured in a simple and cost-effective manner thus reducing the cost of the display device. Due to the presence of the convertible compound the patterned cholesteric layer can be obtained at one and the same temperature and patterning does not require any lithographic patterning step. If the layer has gradient pitch the layer can be manufactured in a short time thus reducing the cost of the device. The patterned layer comprising polymerized and/or cross-linked material is resistant to the processing temperatures involved in manufacturing the LCD and also resistant to ambient temperatures during its service life. The LCD device is UV-resistant. Cross-linking improves the UV-resistance even further.

Furthermore, the patterned cholesteric layer being reflective instead of absorbing and thus in principle 100% efficient, the liquid crystal device can be made highly efficient in terms of light output.

Additional advantages associated with LCD devices in accordance with the invention which are of the reflective type, are that the contrast of the LCD is improved due to the polarization sensitivity of the cholesteric layer, the color purity and reflectivity properties can be selected more independently from one another, and the microstructure of the cholesterically ordered layer can be selected such that the layer reflects diffusively instead of specular. Thus the reflector of the LCD can be of a much simpler structure compared to the complicated reflector structure of LCD devices comprising absorbing color filters.

In a preferred embodiment of the liquid crystal device, the patterned layer has first, second and third regions selectively reflecting red green and blue colored light respectively.

The LC device comprising such a full-color patterned layer is particularly simple to manufacture as the patterned layer can be obtained using a single exposure with a grey-scale mask having regions of three different transmissivities.

In another aspect, in fact an aspect which is wider applicable than the liquid crystal devices comprising the cholesterically ordered layers in accordance with the invention, the invention relates to reflective active matrix liquid crystal display device comprising a liquid crystal layer dispersed between an active and a passive substrate plate, the active substrate plate being present on the side opposite the viewing side and comprising a plurality of optically transparent pixel electrodes and a plurality of active switching elements for controlling the voltage supplied to said pixel electrodes, which switching elements are spatially separated from, positioned subjacent and electrically connected to said plurality of pixel electrodes, wherein the space separating the switching elements and the pixel electrodes is filled with an electrically insulating color selection layer which selectively reflects light of particular wavelengths and renders the switching elements invisible to the light reflected.

The LC device according to this aspect of the invention has a fill-factor of 85–90% compared to 70–80% for conventional LC devices. The fill-factor is the percentage of the display area actually contributing to light-emission. The large fill-factor is, on the one hand, due to the fact that the active switching elements are positioned subjacent the pixel electrodes and are rendered invisible to the viewer by the color selection layer. On the other hand, the color selection layer and the pixel electrodes being located on the same plate, removes the need for accurate alignment of the active and passive plate with respect to each other. Thus, tolerances can be tightened and less non-emissive area is present between the pixels. Conventionally, the passive and active plate need to be accurately aligned because the color selection layer and pixel electrodes are located on separate plates.

Furthermore, as the color selection layer is also used as the layer which insulates the switching elements from the pixel electrodes to prevent short-circuits, a compact liquid crystal device is obtained.

If appropriate, the liquid crystal device further comprises a light-absorbing layer for absorbing any light transmitted by the color selection layer. In order to make the switching elements less visible with respect to light transmitted by the color selection layer, the light-absorbing layer is preferably located between switching elements and the color selection layer.

The advantages associated with the LC devices described above which have a color selection layer arranged between the active switching elements and the pixel electrodes are not exclusively obtained when combined with the patterned cholesterically ordered layers used in the present invention but are obtained using any color selection layer capable of selectively reflecting light of a particular color such that the underlying switching element is masked, that is invisible to the viewer.

An example of such a color selection layer is a diffusely reflecting light-absorbing layer containing conventional dyes and/or pigments. Alternatively, the dyes and/or pigments may be replaced with photoluminescent, fluorescent and/or phosphorescent compounds of a conventional type. An example of a non-absorbing color selection layer is a (conventional) polymer dispersed liquid crystal or any other layer having two phases, one dispersed in the other, which mutually differ in refractive index. The color selection layers may or may not in addition to or instead of reflecting selectively a particular color, selective reflect a particular polarization component of the incident ambient light. If not, the color selection layer may be combined with a polarizer.

Instead of a color selection layer, the electrically insulating may also be a broad-band polarizer, such as a broad-band reflective polarizer, such as a broad-band cholesteric polarizer.

These and other aspects of the invention are apparent from and will be elucidated with reference to the embodiments described hereinafter.

In the drawings:

FIG. 2 shows the chemical structural formulas of some compounds used in the methods according to the invention.

For the sake of clarity, the Figures are not drawn to scale and are schematic.

Figure 1:
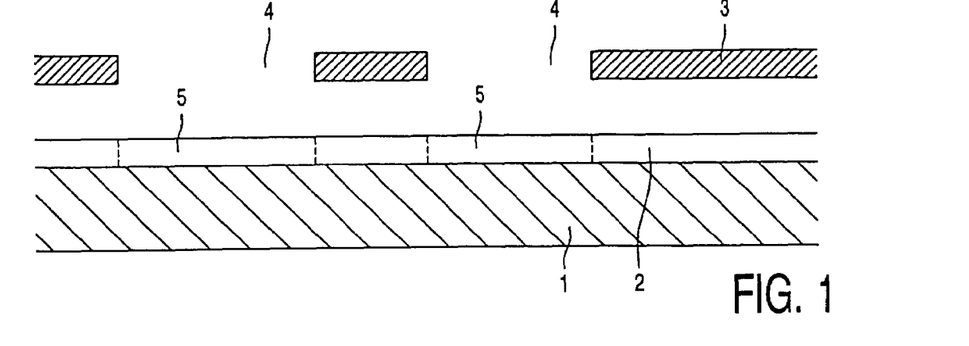
FIG. 1 diagrammatically shows some process steps of the method according to the invention.

Some essential steps of the method according to the invention will be elucidated with reference to FIG. 1. This Figure shows a substrate 1 of, for example glass, a main surface of which is provided with an orientation layer (not shown) of, for example, polyimide. A layer of a polymerizable liquid crystalline material 2 having a thickness of approximately 2 $\mu$m is provided on this layer by means of a thick-film technique (doctor blade coating or spin-coating). This layer is given a cholesteric order by means of the orientation layer. The material is oriented in such a way that the molecular helix of the cholesterically ordered material extends transversely to the layer.

In the relevant case, the liquid crystalline material consisted of a mixture of compound A (RM82, Merck) to which 0.5% by weight of the isomerizable, chiral compound B (RM) had been added. The chemical structural formulas of these compounds are shown in FIG. 2. The compound B induces the formation of the molecular helix in the liquid crystalline material so that the desired cholesteric order is obtained. In the case described, the helix had a pitch of 7.5 $\mu$m.

Subsequently a mask 3 with apertures 4 was positioned above the layer 2 of the cholesterically ordered liquid crystalline material. Layer 2 was selectively irradiated at ambient temperature for 400 s using UV radiation (365 nm, 8 mW/cm$^2$). Due to this irradiation, a large part of the isomerizable, chiral compound B in the irradiated parts 5 was converted from the E form to the Z form. These two forms of the chiral compound have a different influence on the helix of the cholesterically ordered material. It has been found that the pitch of the irradiated parts 5 increased from 7.5 to 40 $\mu$m.

After the irradiation, the mask was removed and the layer was irradiated with an electron-beam. As a result, polymerization and crosslinking of the liquid crystalline material took place. During this treatment, the chiral compound was also polymerized so that it was incorporated in the three-dimensional structure of the cholesterically ordered, polymerized material. The patterned layer 2 thus formed was subsequently removed from the substrate 1. The patterned layer 2 is self-supporting.

The polymerization and/or crosslinking step may alternatively be accomplished by means of actinic radiation, as the next examples illustrate.

EXAMPLE 1

A mixture is made which is composed of 42.5% of a vitrifying liquid crystal compound D (TetraCN, Tg=80° C.), 13% of compound B (RM), 42.5% of a vitrifying liquid crystal compound E having two acrylic moieties (EtherLC, Tg=-20° C.), and 2% photoinitiator (Irgacure 651, Ciba Specialty Chemicals). This combination of compound D and E yields a reactive mixture, which is vitrified at room temperature. Component B is a photo-isomerizable component, which is used to set the pitch of the cholesterically ordered layer. The photo-initiator initiates the polymerization and/or crosslinking reaction.

Mixing is performed at 120° C., yielding a mixture which reflects green light. Said mixture is deposited as a thin film (5 micrometers thick) between two substrates (e.g. glass plates) provided with an orientation layer adjacent to the mixture. Subsequently, this cholestericaly ordered film is cooled down to room temperature, and irradiated with UV light (365 nm) for a short period of time, according to a suitable pattern. Surprisingly, it seems as if the irradiation at room temperature has no effect on the cholesteric film. After irradiation, the temperature of the film was raised to 120° C. During this heating, however, the color of the irradiated areas still underwent a change. The non-irradiated areas did not change color at all. Being at 120° C., the cholesteric film is substantially liquid. The polymerization and/or crosslinking is subsequently initiated by irradiating with UV light (365 nm) for a short period of time according to a suitable pattern. Immediately after this irradiation at high temperature, the irradiated areas solidify due to polymerization and/or crosslinking. The non-irradiated areas remained in a substantially liquid form.

This example also demonstrates that actinic radiation, such as UV light, can be used for both method steps b and c, and that applying two irradiation steps, each at a different temperature, removes any interference of the irradiations of method steps b and c.

EXAMPLE 2

In another example, a mixture is made of 15% of compound B (RM), 84% of compound C (RM257), and 1% Darocure 4265. Darocure 4265 is a photo-initiator which can be activated using 405 nm UV radiation. Said mixture is deposited as a thin film, and subsequently, at room temperature and under ambient atmosphere (air, containing 20% oxygen), irradiated with UV light (365 nm) for a short period of time, according to a suitable pattern. During this irradiation the pitch of the molecular helix in the layer of cholesterically ordered material is altered, and the photo-initiator is activated. However, the polymerization and crosslinking of said layer is hampered because the activated initiator is quenched by the oxygen in the ambient atmosphere. After setting the required pitch, the layer is irradiated with 405 nm UV light under a nitrogen atmosphere. During this irradiation the layer is polymerized and crosslinked with substantially no change in the pitch of the molecular helix in the layer.

Figure 3:
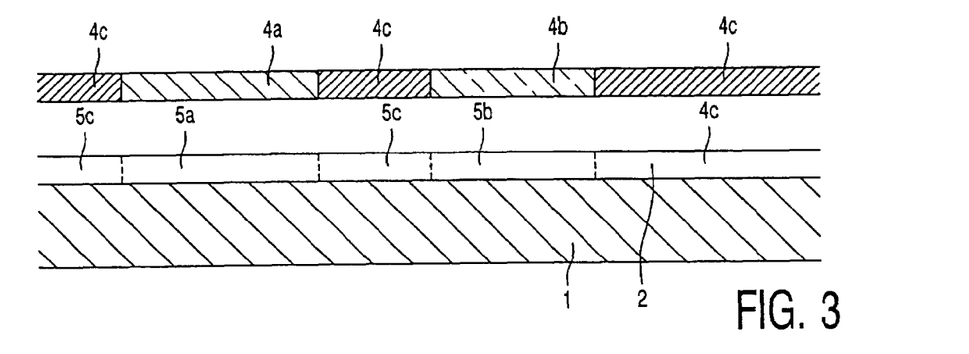
FIG. 3 shows, schematically, the use of a grey-scale mask in a method in accordance with the invention.

FIG. 3 shows, schematically, the use of a grey-scale mask in a method in accordance with the invention. FIG. 3 is identical to FIG. 1 except that in FIG. 3 a grey-scale mask is used with has apertures 4a, 4b, and 4c having mutually different transmissivities. After irradiation a patterned layer of polymerizable cholesterically ordered material having first, second and third regions 5a, 5b and 5c, respectively, which mutually differ in the pitch of the molecular helix.

Polarization Rotator

Another patterned layer for use in the method and devices of the present invention is essentially manufactured in the same way as described with reference to FIG. 1. However, in this case, a synthetic material substrate was used. The substrate was provided with a 2.5 $\mu$m thick layer of a nematic liquid crystalline compound C to which 0.6% by weight of the isomerizable, chiral compound B (E-isomer) had been added, as well as 0.3% by weight of the non-photoisomerizable compound R811 (Merck, structural formula not shown). The addition of the non-photoisomerizable chiral dopant R811, having an opposite twisting sense with respect to compound B, is required to compensate for the residual twisting power of the Z-isomer of compound B.

After the material had been cholesterically ordered, the pitch of the molecular helix was defined at 10 $\mu$m. In combination with a layer thickness of approximately 2.5 µm, this leads to a rotation of approximately 90° of the polarization for visible light. Subsequently, half the layer was irradiated with UV light (365 nm, 20 mW/cm²) for a long period of time via a mask, so that all E isomer of compound B was converted into Z isomer. As a result, the pitch of the cholesterically ordered material became approximately infinite in the irradiated part of the layer, so that, in fact, a nematically ordered material was obtained. The direction of polarization of polarized visible light is not rotated when this light passes through this layer. After polymerization and crosslinking, the layer was removed from the substrate.

It is apparent that patterned polarization rotators can be made by means of the method as described hereinbefore, where the local twist angle of the cholesterically ordered layer and thereby the local rotation of the polarization of a transmitted light beam, is determined by the dose of UV light at that particular position. Lateral resolutions smaller than 10 micron can easily be obtained.

Color-selection Layer

Figure 4:
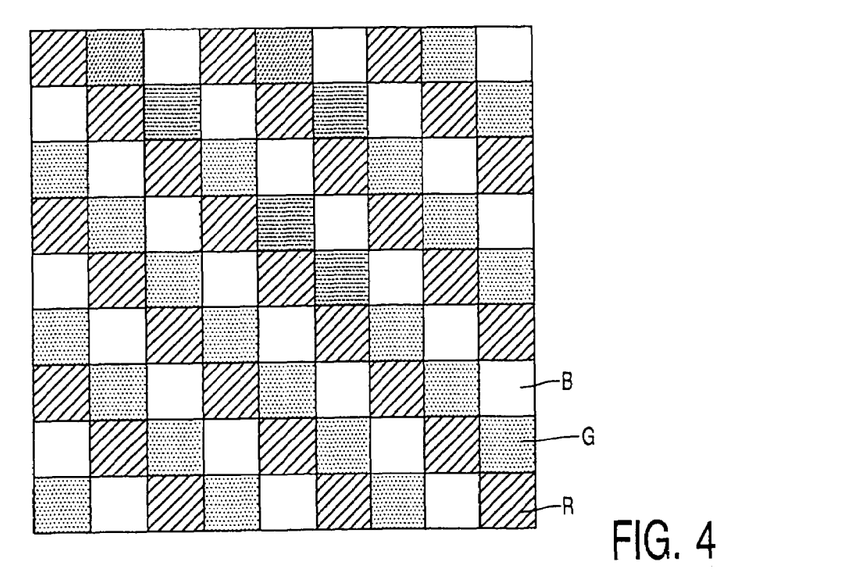
FIG. 4 is a diagrammatic plan view of a color selection layer with a patterned layer of a polymer material having a cholesteric order used in an LC display device in accordance with the invention.

FIG. 4 is a plan view of a color selection layer which mainly consists of a 5 µm thick, patterned layer of a polymer material having a fixed cholesteric order. This layer comprises first regions R, second regions G and third regions B. The pitch of the molecular helix of the cholesterically ordered material in the first regions R is 0.41 µm (red reflection), in the second regions G 0.34 µm (green reflection) and in the third regions B 0.28 µm (blue reflection). Each region has a dimension of 100 µm×100 µm. The color selection layer selectively reflects red, green and blue circularly polarized light in the first, the second and third regions respectively and selective transmits circularly polarized light of the handedness opposite to that the reflected light. Furthermore, the first regions are transparent to both blue and green light of either circular polarization. Likewise, the green regions are transparent to red and blue and the blue regions transparent to red and green light.

The color selection layer was manufactured as follows. A substrate was provided with an approximately 5 µm thin layer of compound C in which 15% by weight of the compound B was incorporated. After ordering, the entire layer had a pitch of the molecular helix of 0.28 µm, which yields the desired blue reflection B. Subsequently, two thirds of the layer were irradiated (365 nm, 5.6 mW/cm²) according to a suitable pattern for 90 seconds so that the irradiated areas had a pitch of the molecular helix of 0.34 µm, which yields the desired green reflection G. Subsequently, half of the areas of the layer that had already been irradiated were further irradiated for 90 seconds so that these twice irradiated areas had a pitch of the molecular helix of 0.41 µm, which yields the desired red reflection R. Finally, the complete layer was polymerized and crosslinked by means of electron-beam irradiation. A color selection layer suitable for use in a liquid crystal display (LCD) was obtained.

In an alternative preferred embodiment of the method according to the invention, the above-mentioned color selection layer is manufactured using a grey-scale mask similar to the one shown in FIG. 3. In this mask, the transmission of the mask apertures intended for the red pixels is 100%, the transmission of the mask apertures intended for the green pixels is 50%, and the UV radiation is completely blocked at the positions intended for the blue pixels. The three envisaged areas having a different pitch can be obtained with this mask in a single irradiation step of 180 sec. Also in this case, the separate pixels had dimensions of 100 µm×100 µm.

Broad-band Polarizer

A further embodiment of a layer of polymerized cholesterically material for use in the LC devices in accordance with the invention is a layer of a cholesterically ordered polymer material, in which the material is oriented in such a way that the axis of the molecular helix of the cholesterically ordered material extends transversely to the layer, and the pitch of the molecular helix is made to vary transversely to the layer.

The method to manufacture such a layer will be elucidated with reference to FIG. 1. This Figure shows a substrate 1 of, for example, glass, a main surface of which is provided with an orientation layer (not shown) of, for example, polyimide. A layer of a liquid crystalline material 2 having a thickness of approximately 10 µm is provided on this layer by means of a thick-film technique (doctor blade coating or spin-coating). This layer is given a cholesteric order by means of the orientation layer. The material is oriented in such a way that the molecular helix of the cholesterically ordered material extends transversely to the layer.

Figure 2A:
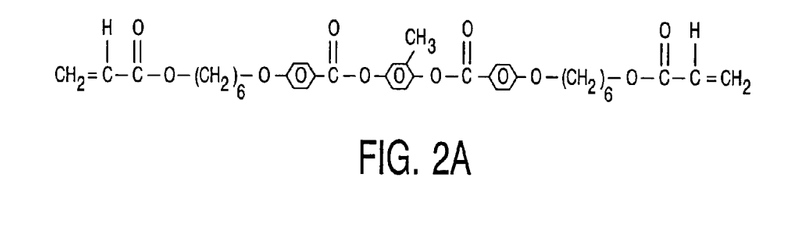
FIG. 2A shows the monomer RM82 (supplied by Merck)
Figure 2B:
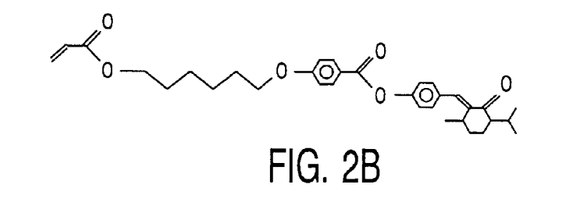
FIG. 2B shows the E isomer of the isomerizable chiral compound (E)-(1R, 4R)-2-(4-(4-hexyloxybenzoyloxy) phenyl—methene) menthan-3-on, which is a reactive menthone (RM)
Figure 2C:
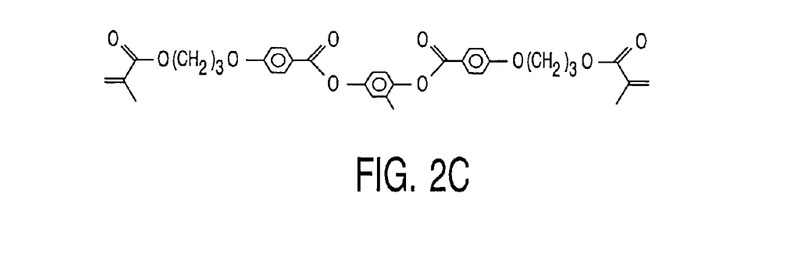
FIG. 2C shows the monomer RM257 (supplied by Merck)
Figure 2D:
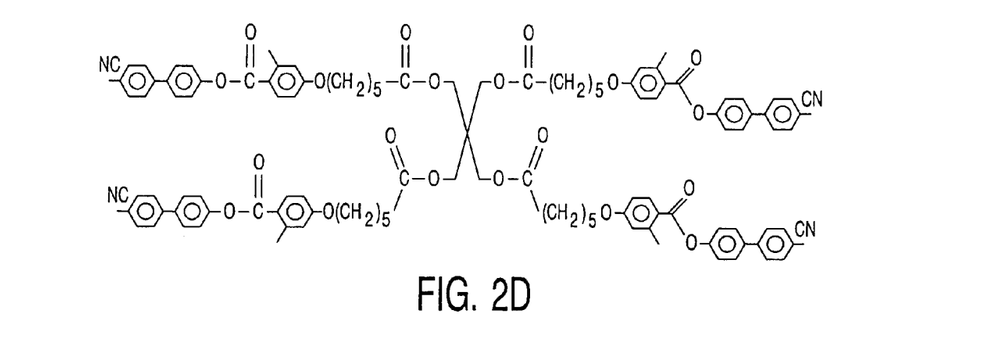
FIG. 2D shows the molecule of the material referred to as TetraCN.
Figure 2E:
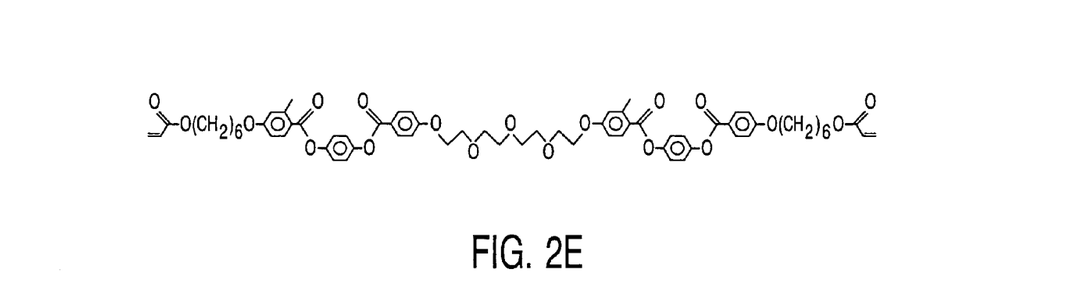
FIG. 2E shows the molecule of the material referred to as EtherLC.
Figure 2F:
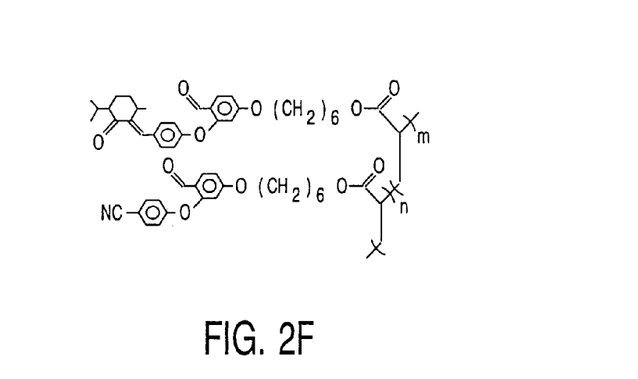
FIG. 2F shows a copolymer having a certain amount of component A as side chains. The copolymer will be referred to as M15, whereby the number represents the mol % of menthone units.

By way of example, the liquid crystalline material consisted of a mixture of 98% by weight of M15, a copolymer with 15 mol % of menthone units (compound 2F), and 2% by weight of an UV absorber (tinuvin 1130, Ciba specialty Chemicals). The chemical structural formulas of some of these compounds are shown in FIG. 2. The copolymer induces the formation of the molecular helix in the liquid crystalline material so that the desired cholesteric order is obtained. In the case described, the helix had a pitch of approximately 0.3 µm.

Subsequently layer 2 was irradiated at ambient temperature in air (containing the normal amount of oxygen) for 10 minutes using UV radiation (365 nm, 2.8 mW/cm²). Due to this irradiation, a part of the isomerizable, chiral compound B in the irradiated layer was converted from the E form to the Z form. Consequently, the color of the layer shifts towards longer wavelengths (red shift).

Figure 5:
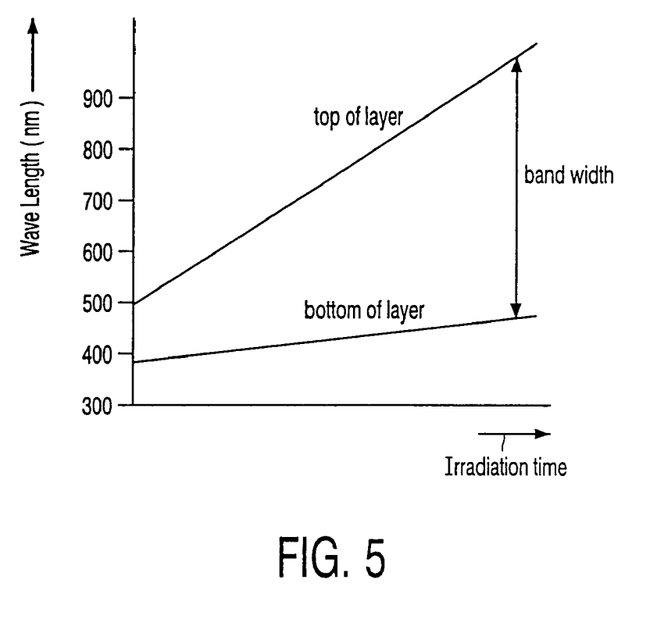
FIG. 5 illustrates the broadening of the reflection band as a function of the irradiation time.
Figure 6:
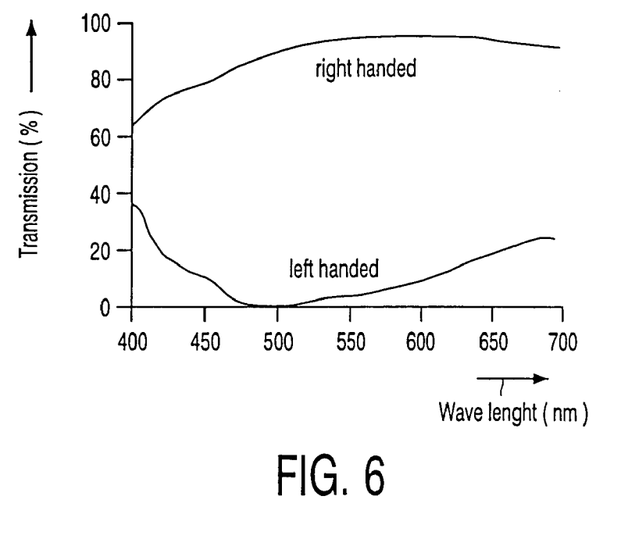
FIG. 6 shows the reflection spectra of a patterned cholesteric layer having a gradient pitch used in an LC device manufactured in accordance with the invention.

Due to the presence of the UV absorber, the intensity of the radiation in the cholesteric layer shows a gradient transverse to the layer. The top of the sample receives more UV light than the bottom of the sample, resulting in a gradient in the amount of converted isomerizable compound. This gradient yields a corresponding gradient in the pitch of the helix of the cholesteric layer. Consequently, the red shift at the bottom of the layer is lower than the red shift at the top of the layer, causing a broadening of the reflection band as demonstrated in FIG. 5.

After establishing the required reflection band, the layer was irradiated with an electron-beam in a nitrogen atmosphere. As a result, crosslinking of the liquid crystalline material took place.

The polymerization and/or crosslinking step may alternatively be accomplished by means of actinic radiation when a small amount of a photo-initiator is added to the mixture of liquid crystalline material. If the photo-initiator is activated by light having the same wavelength as that used for process step b, then step b and step c can be performed simultaneously.

For example, a liquid crystalline material consisted of a mixture of 15% by weight of menthone-acrylate (compound 2A), 82% by weight of RM257 (compound 2C), 2% by weight of an UV absorber (tinuvin 1130, Ciba Specialty Chemicals), 1% by weight of a photo-initiator (Darocure 4265, Ciba Specialty Chemicals), and 300 ppm of an inhibitor (methoxyfenol). The chemical structural formulas of some of these compounds are shown in FIG. 2. A layer of this mixture is provided on a substrate, which comprises an orientation layer of, for example, polyimide. This layer is given a cholesteric order by means of the orientation layer. The material is oriented in such a way that the molecular helix of the cholesterically ordered material extends transversely to the layer.

Subsequently, the layer was irradiated for 3 minutes using UV radiation (365 nm, 6 mW/cm$^2$). Due to this irradiation, a part of the isomerizable, chiral compound A in the irradiated layer was converted from the E form to the Z form. Consequently, the color of the layer shifts towards longer wavelengths (red shift). Due to the presence of the UV absorber, the intensity of the radiation in the cholesteric layer shows a gradient transverse to the layer, resulting in a gradient in the pitch of the helix of the cholesteric layer, causing a broadening of the reflection band. Due to the photo-initiator, the polymerization and crosslinking reaction is initiated. This reaction is hampered by an inhibitor in order to allow the pitch and the gradient in the pitch of the helix of the cholesteric layer to be developed before the three-dimensional network is formed.

When the polymerization and/or crosslinking step is accomplished by means of actinic radiation, interference of process steps b and c is avoided by performing process step b in an oxygen atmosphere which hampers the polymerization and crosslinking if the selected activated initiator is quenched by the oxygen in the ambient atmosphere. For initiating said crosslinking, the irradiation process in accordance with step c is performed in a nitrogen atmosphere.

In another example, a mixture is made of 15% by weight of menthone-acrylate (compound 2A), 82% by weight of RM257 (compound 2C), 2% by weight of an UV absorber (tinuvin 1130, Ciba Specialty Chemicals), 1% by weight of a photo-initiator (Darocure 4265, Ciba Specialty Chemicals). Said mixture is deposited as a thin film on a substrate, and subsequently irradiated with UV light (365 nm, 1 mW/cm$^2$) during 5 minutes. The irradiation is performed under ambient atmosphere (air, containing the usual amount of oxygen). Due to this irradiation, a part of the isomerizable, chiral compound A in the irradiated layer was converted from the E form to the Z form. Consequently, the color of the layer shifts towards longer wavelengths (red shift). Due to the presence of the UV absorber, the intensity of the radiation in the cholesteric layer shows a gradient transverse to the layer, resulting in a gradient in the pitch of the helix of the cholesteric layer, causing a broadening of the reflection band. Due to the photo-initiator, the polymerization and crosslinking reaction is initiated. This reaction is hampered by the oxygen in the ambient atmosphere.

When the desired pitch and the gradient in the pitch of the helix of the cholesteric layer is established, the layer is polymerized and crosslinked using 405 nm UV light (4 mW/cm$^2$) in a nitrogen atmosphere. At this wavelength, the photo-initiator Darocure 4265 can be activated without substantial conversion of the isomerizable compound A. During this irradiation the layer is polymerized and crosslinked with substantially no change in the pitch of the molecular helix in the layer.

Figure 7:
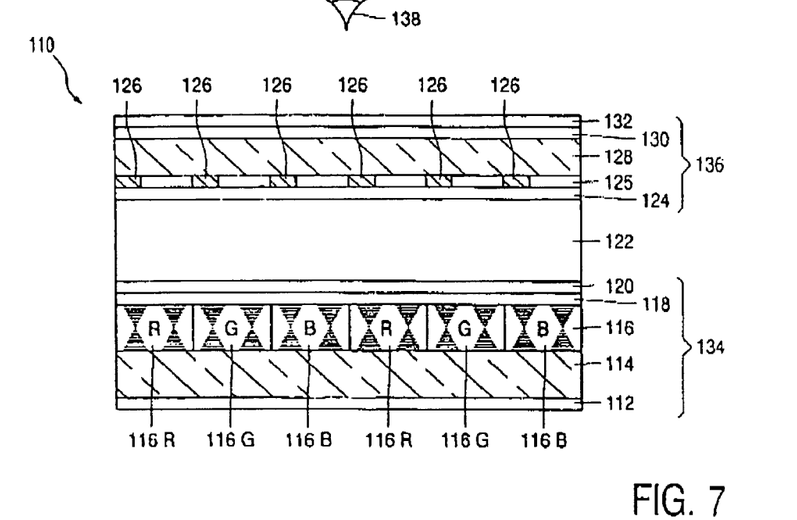
FIG. 7 shows an embodiment of a reflective LC device in accordance with the invention.

It is apparent that a broad-band polarizer can be made by means of the method as described hereinbefore. Said broad-band polarizer comprises a layer of a polymer material having a cholesteric order, the material being oriented in such a manner that the axis of the molecular helix extends transversely to the layer, and the pitch of the molecular helix in the layer is varied Liquid Crystal Devices FIG. 7 shows an embodiment of a reflective LC device in accordance with the invention in the form of the reflective active matrix LC device 110. The LC device comprises a liquid crystal layer 122 dispersed between a first transparent substrate 114 and a second transparent substrate 128. By applying a suitable voltage the LC layer 122 can be switched between two states, a "black" and a "white" state.

In the present embodiment, the liquid crystal layer 122 has in one of the states a retardation of a ½λ and in the other a retardation of 0 or 1λ. The required retardation of ½λ can be realized by any conventional type of LC layer. In particular, twisted nematic (TN), super twisted nematic (STN), ferro-electric (FLC), electrically compensated birefringence (ECB) and vertically aligned nematic (VAN) liquid crystal configurations can be used as the LC layer 122.

On the side of the substrate 114 facing away from the viewer 138 a black light-absorbing layer 112 is located and on the other side thereof a color selection layer in the form of a patterned layer 116 of polymerized material having a fixed cholesteric order wherein the axis of the molecular helix extends transversely to the layer. The patterned layer 116 has first regions 116R, second regions 116G and third regions 116B which selectively reflect red, green and blue cholesterically polarized light, respectively. Depending on the handedness of the molecular helix the reflected light is left or right-hand circularly polarized. The patterned layer 116 is covered with common transparent electrode 118 which is provided with orientation (also referred to as alignment) layer 120. The elements 112, 114, 116, 118, 120 together constitute the passive plate 134. Opposite the passive plate 134 the device 110 comprises an active plate 136. The active plate comprises an alignment layer 124, and electrode layer 125 which include comprises ITO pixel electrodes (not shown) and active switching elements 126. The active switching elements 126 control the voltage supplied to the ITO pixel electrodes and thus allow selective switching of the liquid crystalline layer 122 on a pixel by pixel basis. The active switching elements 126 can be thin-film transistors (TFTs), thin-film diodes, metal-insulator-metal (MIM) devices or the like.

The side of the substrate 128 facing the viewer 138 is provided with a quarter wave plate 130 and linear polarizer 132. Except for the patterned cholesteric layer 116, the components of the LC device may be of a conventional type.

The device shown in FIG. 7 can be modified in various manners without losing the benefits of the present invention. The patterned layer 116 may be located between the layers 118 or 120 or on the other side of the substrate 114. Also, the electrode layers 125 and 118 may be interchanged, and the light-absorbing layer 112 may be located between the substrate 114 and layer 116. The polarizer 132 and retarder 130 may be positioned between the substrate 128 and electrode layer 125.

The LC layer 122 may also be selected to be a quarter wave plate instead of a half wave plate. In that case the retarder 130 must be half wave plate.

Figure 8:
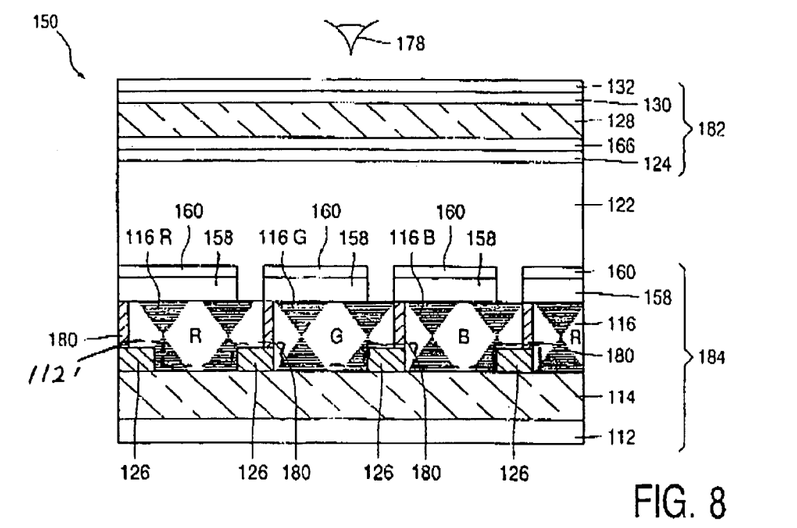
FIG. 8 shows another embodiment of a reflective LC device in accordance with the invention, FIGS. 9 and 10 schematically show the operating principle of an embodiment of a liquid crystal display shown in FIG. 7 or 8.

FIG. 8 shows another embodiment of a reflective LC device in accordance with the invention in the form of the reflective active matrix LC device 150 having a field-shielded pixel design. The LC device 150 has an active plate 184 and a passive plate 182 between which liquid crystal layer 122 is dispersed. The active plate 184 has a substrate 114 provided with light-absorbing layer 112. The substrate 114 is further provided with the color selection layer comprising a patterned layer 116 of polymerized material having a fixed cholesteric order as in the embodiment according to FIG. 7. Between the patterned layer 116 and the substrate 114 active switching elements 126 are provided. On the side of the layer 116 facing the viewer 178, transparent pixel electrodes 158 are present which are electrically connected to the elements 126 by means of the vias 180. The electrodes 158 are covered with alignment layers 160. The passive plate 182 comprises an orientation layer 124, common electrode layer 166, transparent substrate 128, retarder 130 and polarizer 132.

Compared to the device 110, the present embodiment has a larger fill-factor (70–80% for device 110 versus 85–90% for the device 150), that is the area available for light emission is larger, not only because the active elements 126 are positioned subjacent the electrodes 158 but also because there is no need to align the passive plate to the active plate tolerances can be tightened. In conventional displays using absorbing color filters in the passive plate the color filter needs to be accurately aligned with the pixel electrodes 158.

A further advantage is that because the color selection layer also serves as the electrically insulating layer required to prevent short-circuits between the elements 126 and electrodes 158, a very compact liquid crystal device is obtained. In order to make the switching elements 126 less visible, the black light-absorbing layer 112 is preferably located between switching elements 126 and the color filter 116, as illustrated by the dashed region 112' in FIG. 8.

The devices 110 and 150 are reflective active matrix liquid crystal devices. An embodiment of a reflective passive matrix liquid crystal device is simply obtained by replacing in the device 110 the common electrode 118 by a plurality of row electrodes and the electrode layer 125 comprising the active elements 126 by a plurality of column electrodes which cross the row electrode at right angles. The area of overlap of the row and the column electrodes define the display pixels. Another embodiment of a passive matrix device is obtained if, in the device 150, the active elements 126 and vias 180 are left out, the pixel electrodes 158 are arranged to form a plurality of column electrodes and the common electrode 166 is replaced by a plurality of row electrodes.

Figure 9:
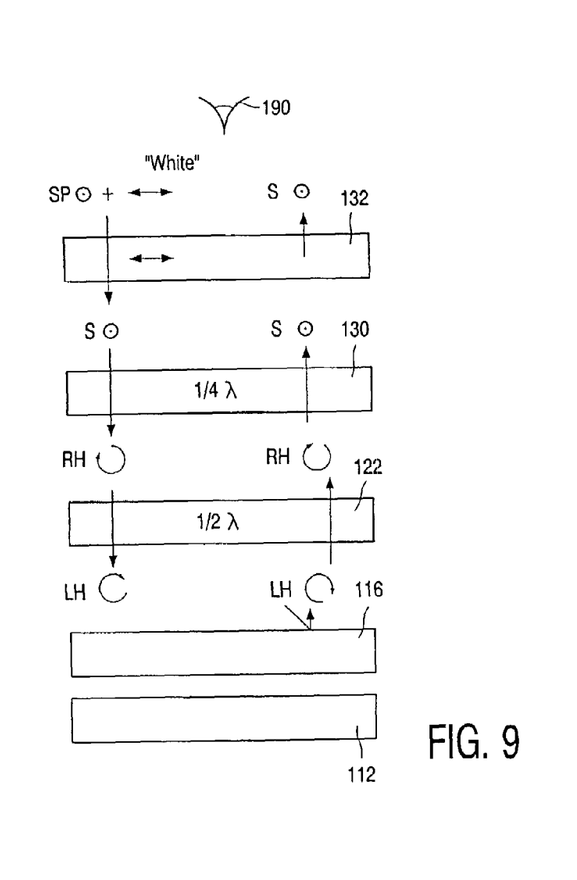
Figure 10:
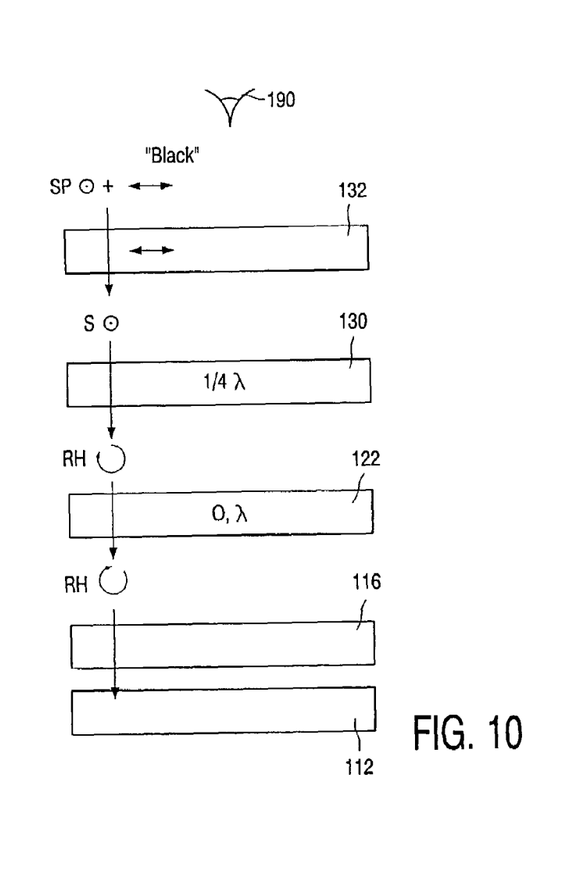

Whether active or passive, the manner in which light is processed by the LC devices is essentially the same. FIGS. 9 and 10 schematically show the operating principle of an embodiment of a liquid crystal display shown in FIG. 7 or 8.

In the "white" (or "ON") state (FIG. 9), unpolarized ambient light sp is incident on the display and is first polarized by the polarizer 132 to give s-polarized light which is in turn converted to right-handed circularly polarized light RH by the quarter wave plate 130. The LC layer 122 has a retardation of ½λ and thus changes the handedness of the light incident thereon thus producing left-handed circularly polarized light LH. The patterned cholesteric layer 116 has regions reflecting LH polarized light and transmitting RH polarized light. The LH polarized light reflected by the layer 116 is converted by the LC layer 122 into RH circularly polarized light. The quarter wave plate 132 converts the LH polarized light to s-polarized light which is transmitted by the polarizer 132 undisturbed thus reaching the viewer 190.

Referring to FIG. 10, with a voltage applied to the LC layer 122 (or, if the LC layer 122 is chosen such that it behaves as a quarter wave plate when a voltage is applied, with no voltage supplied to the LC layer 122), the LC layer 122 has a retardation of 0 or 1 λ.

Therefore, RH circularly polarized light incident on the LC layer 122 is transmitted undisturbed and is also transmitted by the cholesteric layer 116 to be absorbed by the light-absorbing layer 112. The pixel of the display thus appears dark.

Figure 11:
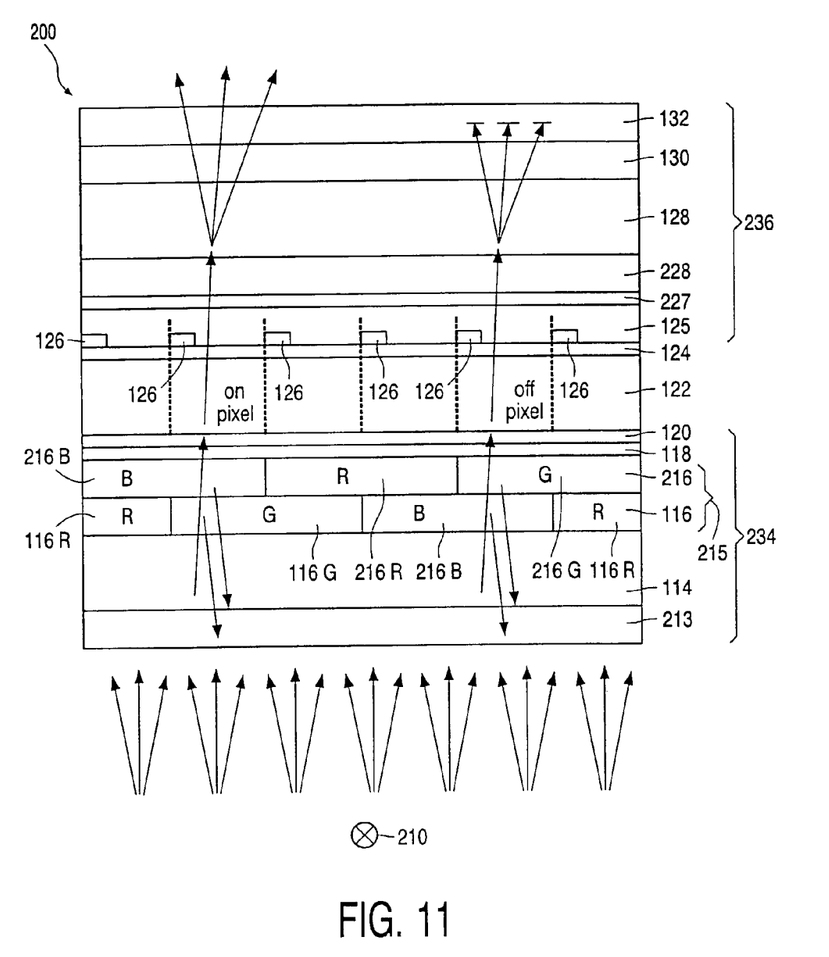
FIG. 11 shows, schematically, in a cross-sectional view, a transmissive active matrix liquid crystal device in accordance with the invention.

FIG. 11 shows, schematically, in a cross-sectional view, a transmissive active matrix liquid crystal device in accordance with the invention. The transmissive active matrix liquid crystal device 200 has an active plate 236 and passive plate 234. The passive plate 236 is identical to the passive plate 136 of FIG. 7 except that the passive plate 236 comprises a silicon-dioxide overlayer 227 and an embossed holographic diffuser film 228 which serves to enlarge the viewing angle. Both the layers 227 and 228 are inessential to the present invention. The passive plate 234 comprises a glass substrate 114 provided with a polarizer 213 which supplies left-handed circularly polarized light to the color filter 215. The polarizer 213 may be any polarizer capable of providing the required functionality however, because of its high efficiency, a polarizer of the reflective type such as a broad-band cholesteric polarizer, in particular one manufactured in accordance with the present invention, is preferred. The color filter 215 comprises patterned layers 116 and 117 of polymerized material having a fixed cholesteric order. The layer 116 has regions 116R, 116G and 116B which selectively reflect red green and blue left-handed circularly polarized light respectively. The layer 117 has similar regions 117R, 117G and 117B which are arranged shifted by half a period with respect to the regions of the layer 116 thus creating areas of overlap (116R, 117G) (116R, 117B) (116G, 117R) (116G, 117B) (116B, 117R) and (116B, 117G). Alternatively, the regions may be shifted by a third of a period (or two-thirds of a period). At each area of overlap two primary colors are reflected and one is transmitted. Thus, the combined layers 116 and 117 provide an RGB full-color filter for transmission of left-handed circularly polarized light. Of course, also right-hand filters can be constructed in this manner.

As with the reflective devices, variations on the device 200 are possible. The color filter 115 may be located between the layers 118 or 120 or on the other side of the substrate 114. Also, the electrode layers 125 and 118 may be interchanged, whereas the broad-band polarizer 213 may be located between the substrate 114 and layer 116. The polarizer 132 and retarder 130 may be positioned between the substrate 128 and electrode layer 125.

The LC layer 122 may selected to be a quarter wave plate in which case the retarder 130 is a ½λ plate. However, preferably, an LC layer 122 which can be switched form a retardation of ½λ to 0 or 1 λ and back in combination with a ¼λ retarder 130 is used.

Assuming such a ½λ LC layer 122 is used, the device 200 operates as follows: Unpolarized white light provided by the back-light system 210 is filtered by the broad-band polarizer 213, such as a broad-band cholesteric polarizer, to produce left-handed circularly (LH) polarized white light. In particular a broad-band polarizer as described hereinabove can be used as the polarizer 213.

The LH polarized white light is incident on the color filter 115 which converts the incident beam into spatially separated transmitted beams of red green and blue left-hand circularly polarized light.

If the LC layer 122 is in the ½λ retardation state, the LH polarized light is converted into RH polarized light, whereas if the LC layer 122 is in the other state having 0 (1) λ retardation, the handedness is unchanged and LH polarized light is transmitted.

The ¼ wave plate 130 converts the LH polarized light into linear s-polarized (i.e. p-polarized) light and RH polarized light into p-polarized (i.c. s-polarized) light. The linear polarizer 132, depending on how it is arranged with respect to the ¼ plate 130, transmits either s-polarized or p-polarized light and absorbs (i.c. reflects) the other polarization thus providing a black or white state.

The color filter 215 is a reflective color filter. Thus, for example, an area of overlap transmitting blue LH polarized light reflects the red and green components of the incident LH polarized white light. This reflected light is also LH polarized. If the polarizer 213 is selected to be a reflective type, such as a broad-band cholesteric polarizer, recycling of this reflected light is obtained since the LH polarized light reflected by the color filter 215 is transmitted undisturbed by the polarizer 213. It is then depolarized by the back-light system 210 (due to scattering and/or reflection events) and offered again to the polarizer 213 which selectively transmits the LH polarized component thereof. In this manner, a highly efficient liquid crystal device is obtained.

Except for the manufacture of the patterned layers 116 and 216 the method of manufacture is described hereinabove, the LC devices of the present invention can be manufactured using conventional methods. Typically, the passive and active plate are manufactured separate from one another starting from transparent substrates and these plates are then joined together using adhesive provided along the perimeter of the active and passive plate leaving an opening for the provision of the LC material. Spacers are used to provide the proper spacing between the plates. The cell thus obtained is then (vacuum)-filled with LC material. By way of example, the passive plate 134 of FIG. 7 is manufactured by providing on a glass substrate 114 a light-absorbing layer 112. On the side of the substrate 114 facing away from the light-absorbing layer 112, the patterned layer 116 is provided in accordance with the method for the manufacture of the color selection layer described hereinabove. The substrate 114 may serve as the substrate on which the polymerizable material is provided and the process steps b and c are carried out. Alternatively, a self-supporting patterned layer 116 may be manufactured on a separate substrate on which the method steps a b and c are carried out in the form of a ready-made film which is then provided on the substrate 114.

What is claimed is:

1. A reflective active matrix liquid crystal display device comprising
 a liquid crystal layer dispersed between an active and a passive substrate plate,
 the active substrate plate being present on the side opposite the viewing side and comprising
  a plurality of optically transparent pixel electrodes and
  a plurality of active switching elements for controlling the voltage supplied to said pixel electrodes,
 the switching elements being spatially separated from, positioned subjacent and electrically connected to said plurality of pixel electrodes,
 wherein the space separating the switching elements and the pixel electrodes is filled with an electrically insulating color selection layer which selectively reflects light of particular wavelengths and renders the switching elements invisible to the light reflected.

2. The liquid crystal display device of claim 1, wherein a light-absorbing layer for absorbing light transmitted by the color selection layer is located between the color selection layer and the active switching elements.

3. The liquid crystal display device of claim 1, wherein the color selection layer is patterned with discrete areas of at least two different reflective colors.

4. The liquid crystal display device of claim 3, wherein the at least two different reflective colors include red, green, and blue.

5. The liquid crystal display device of claim 1, wherein the switching elements are electrically connected to the pixel electrodes by vias that traverse the color selection layer.

6. The liquid crystal display device of claim 1, wherein the pixel electrodes provide an area of light emission that corresponds to at least 85% of a total display area.

7. The liquid crystal display device of claim 1, wherein an alignment of the passive substrate plate within the device is substantially independent of an alignment of the color selection layer.

* * * * *